(12) United States Patent
Ergen et al.

(10) Patent No.: US 9,210,355 B2
(45) Date of Patent: Dec. 8, 2015

(54) APPARATUS AND METHODS FOR CONTROLLING AN ENTERTAINMENT DEVICE USING A MOBILE COMMUNICATION DEVICE

(75) Inventors: Charles W. Ergen, Englewood, CO (US); Max S. Gratton, Lakewood, CO (US)

(73) Assignees: ECHOSTAR TECHNOLOGIES L.L.C., Englewood, CO (US); DISH NETWORK L.L.C., Englewood, CO (US)

( * ) Notice: Subject to any disclaimer, the term of this patent is extended or adjusted under 35 U.S.C. 154(b) by 2256 days.

(21) Appl. No.: 12/046,555

(22) Filed: Mar. 12, 2008

(65) Prior Publication Data

US 2009/0233593 A1   Sep. 17, 2009

(51) Int. Cl.
| | |
|---|---|
| *H04M 1/00* | (2006.01) |
| *H04N 5/44* | (2011.01) |
| *H04M 1/725* | (2006.01) |
| *H04N 21/41* | (2011.01) |
| *H04N 21/422* | (2011.01) |
| *H04N 21/4227* | (2011.01) |

(52) U.S. Cl.
CPC ......... *H04N 5/4403* (2013.01); *H04M 1/72533* (2013.01); *H04N 21/4126* (2013.01); *H04N 21/4227* (2013.01); *H04N 21/42204* (2013.01); *H04N 2005/443* (2013.01); *H04N 2005/4428* (2013.01); *H04N 2005/4441* (2013.01)

(58) Field of Classification Search
CPC . H04N 5/4403; H04M 1/72533; H04W 24/00
USPC ........................................................ 455/556.1
See application file for complete search history.

(56) References Cited

U.S. PATENT DOCUMENTS

| | | | |
|---|---|---|---|
| 5,138,649 A | 8/1992 | Krisbergh et al. | |
| 5,734,371 A | 3/1998 | Kaplan | |
| 5,901,366 A | 5/1999 | Nakano | |
| 6,549,792 B1 | 4/2003 | Cannon et al. | |
| 6,698,020 B1 | 2/2004 | Zigmond | |

(Continued)

FOREIGN PATENT DOCUMENTS

| | | |
|---|---|---|
| EP | 1 655 955 A2 | 5/2006 |
| JP | 2006-203593 A | 8/2006 |

(Continued)

OTHER PUBLICATIONS

Invitation to Pay Additional Fees and Partial Search Report Received for PCT Application PCT/US2009/034559, mailed on Nov. 18, 2009.

(Continued)

*Primary Examiner* — Marcos Batista
(74) *Attorney, Agent, or Firm* — Seed IP Law Group PLLC

(57) ABSTRACT

Various embodiments of apparatus and/or methods are described for remotely controlling an entertainment device using a mobile communication device. A user utilizes a mobile communication device to input information that requests manipulation of playback of content outputted for presentation by an entertainment device. The mobile communication device transmits the user input to the entertainment device, and responsive to receiving the user input, the mobile communication device manipulates playback of the video content.

18 Claims, 8 Drawing Sheets

(56) References Cited

U.S. PATENT DOCUMENTS

| | | | |
|---|---|---|---|
| 6,732,366 B1 | 5/2004 | Russo | |
| 6,741,684 B2 | 5/2004 | Kaars | |
| 6,850,221 B1 | 2/2005 | Tickle | |
| 7,155,213 B1 | 12/2006 | Almeda et al. | |
| 7,167,122 B2 | 1/2007 | Stefanik | |
| 7,194,259 B2 | 3/2007 | DeLine | |
| 8,152,642 B2 | 4/2012 | Ergen et al. | |
| 2002/0056112 A1 | 5/2002 | Dureau et al. | |
| 2002/0129088 A1 | 9/2002 | Zhou et al. | 709/200 |
| 2003/0093813 A1* | 5/2003 | Shintani et al. | 725/133 |
| 2003/0222856 A1 | 12/2003 | Fedorak et al. | |
| 2004/0066302 A1 | 4/2004 | Menard et al. | |
| 2004/0117038 A1 | 6/2004 | Karaoguz | |
| 2004/0178995 A1 | 9/2004 | Sterling | |
| 2004/0203374 A1 | 10/2004 | Zilliacus | |
| 2004/0250273 A1 | 12/2004 | Swix et al. | |
| 2005/0275758 A1 | 12/2005 | McEvilly et al. | 348/725 |
| 2006/0031549 A1 | 2/2006 | Janik et al. | |
| 2006/0109263 A1 | 5/2006 | Wang et al. | |
| 2006/0123449 A1 | 6/2006 | Ma et al. | |
| 2006/0139451 A1 | 6/2006 | Yoneno | |
| 2006/0229124 A1 | 10/2006 | Walker et al. | |
| 2006/0233519 A1 | 10/2006 | Narita | |
| 2006/0271953 A1 | 11/2006 | Jacoby et al. | 725/34 |
| 2007/0050054 A1* | 3/2007 | Sambandam Guruparan et al. | 700/65 |
| 2007/0080831 A1* | 4/2007 | Miyamoto et al. | 340/995.28 |
| 2007/0080940 A1* | 4/2007 | Aoki et al. | 345/158 |
| 2007/0124779 A1 | 5/2007 | Casey et al. | |
| 2007/0130582 A1* | 6/2007 | Chang et al. | 725/37 |
| 2007/0152961 A1 | 7/2007 | Dunton et al. | |
| 2007/0222750 A1 | 9/2007 | Ohta | |
| 2007/0240179 A1* | 10/2007 | Lavigne | 725/14 |
| 2007/0252813 A1 | 11/2007 | Liberty et al. | |
| 2007/0257880 A1 | 11/2007 | Nakao et al. | |
| 2007/0257886 A1 | 11/2007 | Uotani et al. | |
| 2008/0059060 A1 | 3/2008 | Irish | |
| 2008/0077950 A1 | 3/2008 | Burke et al. | 725/1 |
| 2009/0133070 A1* | 5/2009 | Hamano et al. | 725/46 |
| 2009/0233593 A1 | 9/2009 | Ergen et al. | |
| 2009/0249407 A1 | 10/2009 | Manne et al. | 725/68 |
| 2009/0319672 A1 | 12/2009 | Reisman | 709/227 |
| 2010/0280897 A1 | 11/2010 | Elia et al. | 705/14.31 |
| 2011/0016503 A1 | 1/2011 | Schaefer et al. | 725/115 |

FOREIGN PATENT DOCUMENTS

| | | |
|---|---|---|
| JP | 2006-246064 A | 9/2006 |
| JP | 2006-301777 A | 11/2006 |
| JP | 2006-309660 A | 11/2006 |
| JP | 2006-324860 A | 11/2006 |
| JP | 2007-274605 A | 10/2007 |
| KR | 10-2007-0100966 | 10/2007 |
| WO | 97/08632 A2 | 3/1997 |
| WO | 2007/073422 A1 | 6/2007 |

OTHER PUBLICATIONS

Ergen ET. AL.,U.S. Appl. No. 12/046,568, filed Mar. 12, 2008.
International Search Report for PCT/US2009/034559 mailed Jan. 18, 2010.
Office Action dated Jan. 20, 2012, for corresponding Korean Application No. 10-2010-7020215, 5 pages.
Kalva et al., "Multi-view Video Navigation Using Motion Sensing Remote Controllers," *International Conference on Consumer Electronics*, IEEE, Las Vegas, Nevada, Jan. 9-13, 2008, pp. 1-2.

* cited by examiner

APPARATUS AND METHODS FOR CONTROLLING AN ENTERTAINMENT DEVICE USING A MOBILE COMMUNICATION DEVICE

BACKGROUND

The average home presently includes a variety of entertainment devices, each remotely operated by a separate remote control. Therefore, a user often needs to keep track of multiple remote controls while experiencing audio and/or video content. This has been a problem for many users, and modern video viewing systems have become so complex that many users cannot navigate the controls of entertainment devices without the assistance of the associated remote controls. However, because remote controls are easily misplaced, it becomes difficult for users to navigate their video viewing systems without the assistance of advanced navigation tools provided by remote controls.

BRIEF DESCRIPTION OF THE DRAWINGS

The same number represents the same element or same type of element in all drawings.

DETAILED DESCRIPTION

The various embodiments described herein generally provide apparatus, systems and methods which facilitate the reception, processing, outputting and communication of content from one or more sources, via one or more communication mediums (or networks), to one or more communication devices for presentation to one or more end-users. More particularly, the various embodiments described herein generally provide apparatus, systems and methods which facilitate controlling the presentation of content by entertainment devices using a mobile communication device. In short, the various embodiments described provide apparatus, systems and/or methods in which a mobile communication device is utilized to remotely control an entertainment device.

In at least one embodiment, the content to be received, processed, outputted and/or communicated may come in any of various forms including, but not limited to, audio, video, data, information, or otherwise. Likewise, the entertainment device to be controlled may comprise any device capable of presenting audio, video and/or audio/video (A/V) content. It is to be appreciated that content may be provided from any source, such as an over-the-air broadcast, a satellite or cable television distribution system, a digital video disk (DVD) or other optical disk, the internet or other communication networks and the like.

Figure 1:
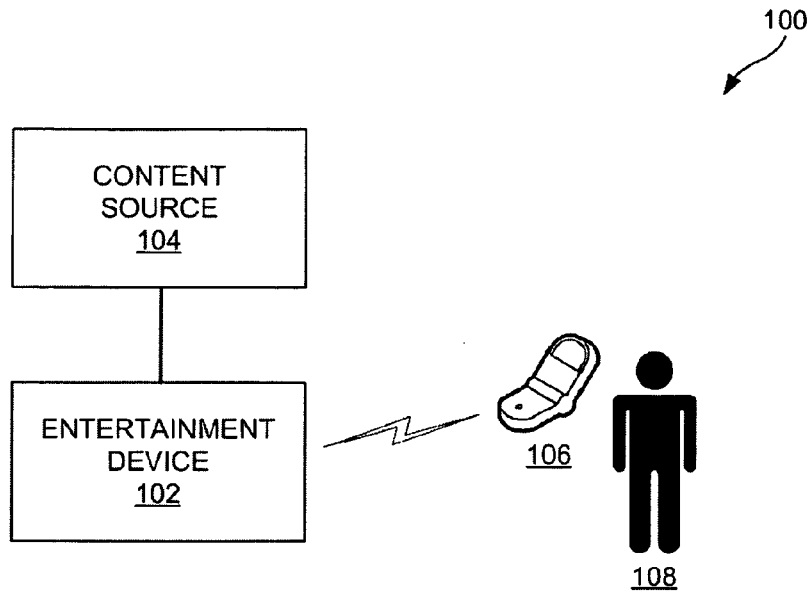
FIG. 1 illustrates an embodiment of an entertainment system.

FIG. 1 illustrates an embodiment of an entertainment system 100. The entertainment system 100 presents content to a user 108. In at least one embodiment, the content presented to the user 108 includes a video stream, such as a television program, movie or other recorded content and the like. The entertainment system 100 includes an entertainment device 102, a content source 104 and a mobile communication device 106. Each of these components is discussed in greater detail below. The entertainment system 100 may include other devices, components or elements not illustrated for the sake of brevity.

The entertainment device 102 is operable to receive content from one or more content source(s) 104, and to present the received content to the user 108. In at least one embodiment, the entertainment device 102 is a display device configured to display content to the user 108. The entertainment device 102 may receive a video stream in any format (e.g., analog or digital format), and present the video stream to the user 108. The entertainment device 102 may be further configured to display menus and other information that allow a user 108 to control the presentation of content by the entertainment device 102. In other embodiments, the entertainment device 102 is a set-top box (e.g., a satellite or cable television converter box), digital video recorder (DVR) or other similar device that processes and provides one or more audio and/or video output streams to a display device for presentation to the user 108. It is to be appreciated that the entertainment device 102 may also be embodied as an apparatus combining the functionality of a display device and a set-top box, digital video recorder (DVR) or the like.

The content source 104 may comprise any system or apparatus configured to provide presentation data, such as a video stream, to the entertainment device 102. The content source 104 may be external or internal to the entertainment device 102. The entertainment device 102 and the content source 104 may be communicatively coupled through any type of wired or wireless connection, communication network and the like. Exemplary content sources include television distribution systems (e.g., over-the-air distribution systems, cable television distribution systems, satellite television distribution systems and broadband distribution systems), DVD players and other optical disk players, digital storage mediums (e.g., DVRs) and the internet.

The mobile communication device 106 may comprise any system or apparatus configured to provide communication services to the user 108. The communication services provided by the mobile communication device 106 may comprise voice, data and/or video services. The mobile communication device 106 may communicate using any type of communication medium or protocol. For example, the mobile communication device 106 may wirelessly communicate with a communication network (not shown in FIG. 1) over a radio frequency (RF) communication link. In at least one embodiment, the mobile communication device 106 is a wireless telephone that communicates over a cellular network.

The mobile communication device 106 is further configured to wirelessly communicate with the entertainment device 102. The mobile communication device 106 and the entertainment device 102 may communicate over any type of wireless communication link, such as an RF or infrared (IR) communication link. More particularly, the mobile communication device 106 receives user input requesting to control the presentation of content by the entertainment device, and transmits the user input to the entertainment device 102 for processing. Responsive to receiving the user input and/or other information from the mobile communication device 106, the entertainment device 102 modifies the presentation of the content by the entertainment device 102.

Figure 2:
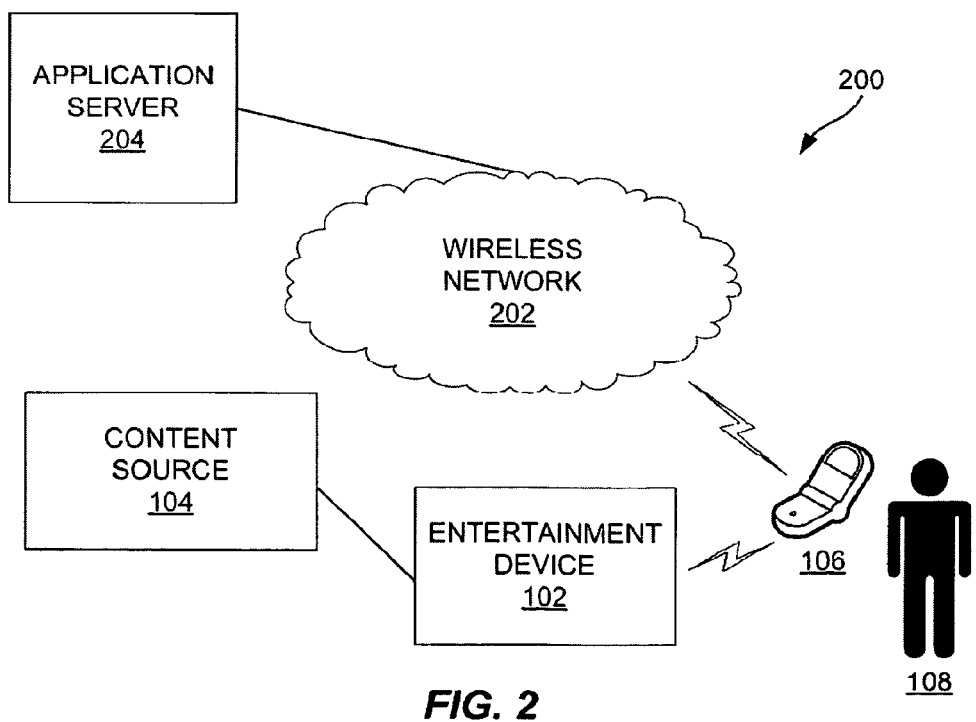
FIG. 2 illustrates an embodiment of a communication system.

FIG. 2 illustrates an embodiment of a communication system 200. The communication system 200 is configured to present content to the user 108. The communication system 200 includes an entertainment device 102, a content source 104, a mobile communication device 106, a wireless network 202 and an application server 204. Each of these components is discussed in greater detail below. The description of components common to FIG. 1 is omitted herein for the sake of brevity. Further, the communication system 200 may include other components, devices or elements not illustrated for the sake of brevity.

The mobile communication device 106 is configured to wirelessly communicate with an application server 204 through the wireless network 202. In at least one embodiment, the mobile communication device 106 receives data from the entertainment device 102, and transmits the data to the application server 204 through the wireless network 202. The entertainment device 102 may provide the mobile communication device 106 with any type of data for transmission to the application server 204. Exemplary data transmitted from the entertainment device 102 to the application server 204 includes pay-per-view ordering information, error and diagnostic reports regarding the entertainment device, interactive television information (e.g., user responses to on-screen prompts), demographic information, audio and video chat data, survey data and user generated content. In at least one embodiment, the application server 204 may also transmit data to the entertainment device 102 through the mobile communication device 106. For example, the application server 204 may provide the entertainment device 102 with buddy lists, social networking profiles, programming guides, video programming, updated firmware and the like.

Application server 204 is operable for receiving, generating and communicating content by and between entertainment device 102 and other systems and devices. In at least one embodiment, the application server 204 is operable for receiving health and diagnostic reports, pay-per-view ordering information and the like from the entertainment device 102 and further processing the received data according to desired design criteria. For example, pay-per-view ordering information received from the entertainment device 102 may be utilized for generating a bill for the user 108. Health and diagnostic information may be used to identify problems with the entertainment device 102, either individually or across an entire product line. In at least one embodiment, the application server 204 may transmit firmware or software updates to the entertainment device 102 responsive to processing the health and diagnostic information.

In at least one embodiment, the application server 204 is operable for receiving demographic information from the entertainment device 102 through the mobile communication device 106. The generation of the demographic information is described in further detail below. In some embodiments, the application server 204 receives and processes data received from the entertainment device 102, and responsively populates and/or updates buddy lists, social networking profiles and the like related to the user 108. It is to be appreciated that the mobile communication device 106 may act as a backchannel for any type of data transmitted from the entertainment device 102 to the application server 204, depending on desired design criteria.

Figure 3:
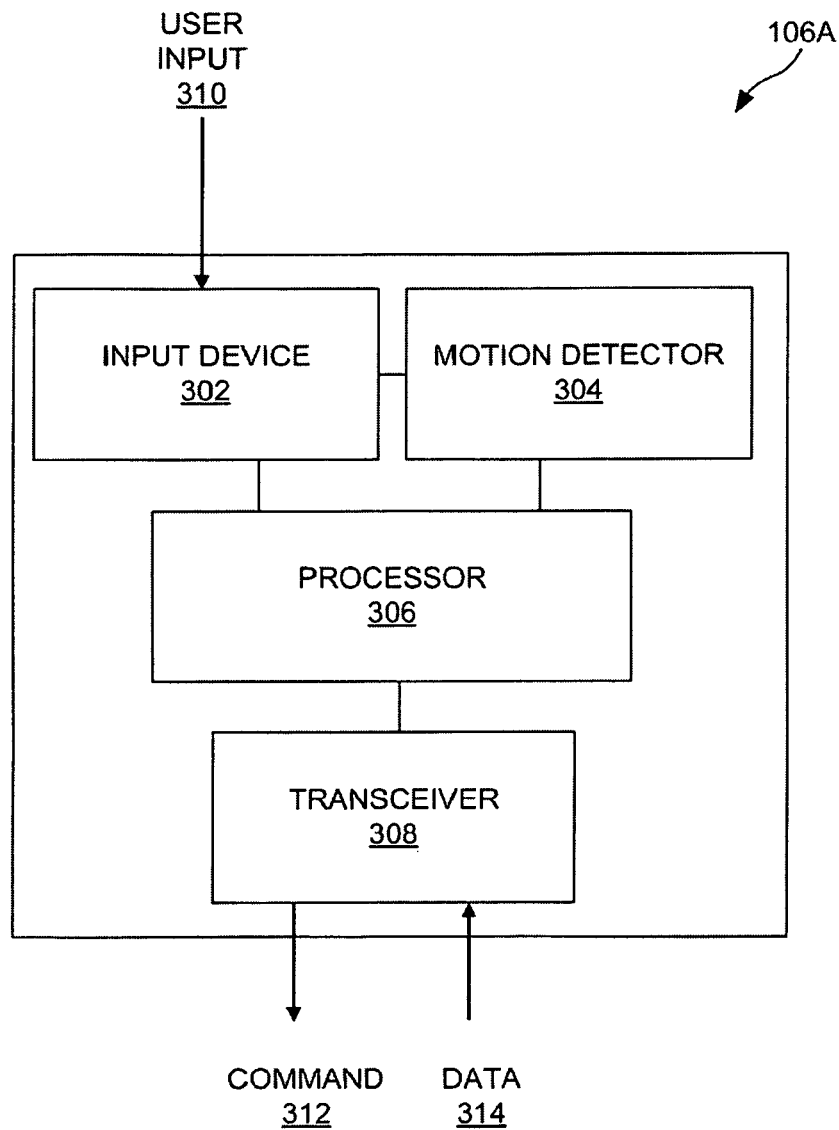
FIG. 3 illustrates an embodiment of a mobile communication device of FIG. 2.

FIG. 3 illustrates an embodiment of a mobile communication device 106A of FIG. 2. FIG. 3 will be discussed in reference to the communication system 200 illustrated in FIG. 2. The mobile communication device 106A includes an input device 302, a motion detector 304, a processor 306 and a transceiver 308. Each of these components is discussed in greater detail below. The mobile communication device 106A may include other components, devices or elements not illustrated for the sake of brevity.

The input device 302 is operable for receiving user input 310 from the user 108 (see FIG. 2). In at least one embodiment, the input device 302 is a keypad typically found on wireless telephones. A user may utilize the keypad to input channel numbers, control the volume of the entertainment device 102 (see FIG. 2), navigate menus and/or control other functions of the entertainment device 102. In at least one embodiment, the input device 302 comprises a touch screen that displays a virtual remote control. In other words, the input device 302 displays on screen an image of a remote control utilized to remotely operate the entertainment device 102 (see FIG. 2). The details of the virtual remote control will be discussed in greater detail below.

The motion detector 304 is operable for determining positional information regarding the mobile communication device 106A. The positional information is utilized to generate commands for the entertainment device 102 (see FIG. 2). Exemplary motion detector devices include mechanical switches, gyroscopes and accelerometers. Motion detectors may be utilized that detect motion, vibration or acceleration among any number of axis. For example, a three element accelerometer may be utilized for detecting accelerations along an x, y and z axis.

In at least one embodiment, the entertainment device 102 may include a sensor bar that emanates multiple light sources. For example, the sensor bar may be mounted in a stationary position near the entertainment device 102 (see FIG. 2). The motion detector 304 is operable to detect and measure the intensity and size of the light sources. Responsive to measuring the intensity and size of the light sources, the motion detector 304 performs mathematical operations to determine the coordinates (e.g., positional information) of the mobile communication device 106A. The positional information, including coordinates of the mobile communication device 106A and/or the direction of movement may be utilized to determine the coordinates of a cursor outputted for presentation by the entertainment device 102.

The processor 306 is operable for generating commands that are compatible with the entertainment device 102 (see FIG. 2). The processor 306 receives the user input 310 from the input device 302 and the positional information from the motion detector 304 and translates the user input 310 and the positional information into the command 312. In at least one embodiment, the processor 306 customizes the appearance of a virtual remote control displayed on the input device 302. For example, the buttons of the virtual remote control displayed by a touch screen of the input device 302 may be customized based on a particular menu displayed on screen by the entertainment device 162. In some embodiments, the processor 306 controls the transmission of data from the entertainment device 102 (see FIG. 2) to the application server 204.

The transceiver 308 is operable for wirelessly transmitting data, such as the command 312, to the entertainment device 102. The transceiver 308 is also operable for receiving the data 314 from the entertainment device 102 and further transmitting the data 314 to other devices, such as the application server 204. While the transceiver 308 is described as having bi-directional transmission capability, it is to be appreciated that mobile communication device 106A may alternatively include a wireless transmitter providing transmission only capability. The transceiver 308 may operate using any type of IR or RF communication link, including WiFi, Bluetooth, cellular communication and the like. In at least one embodiment, the transceiver 308 is operable for transmitting data across multiple types of communication links. For example, the transceiver 308 may receive the data 314 from the entertainment device 102 (see FIG. 2) over a WiFi link, and may reformat the data 314 for transmission to the application server 204 over the wireless network 202. In some embodiments, the mobile communication device 106A may include multiple transceivers, transmitters and/or receivers capable of handling reception and/or transmission across multiple types of communication links.

Those of ordinary skill in the art will appreciate that the various functional elements 302 through 308 shown as operable within the mobile communication device 106A may be combined into fewer discrete elements or may be broken up into a larger number of discrete functional elements as a matter of design choice. Thus, the particular functional decomposition suggested by FIG. 3 is intended merely as exemplary of one possible functional decomposition of elements within the mobile communication device 106A.

Figure 4:
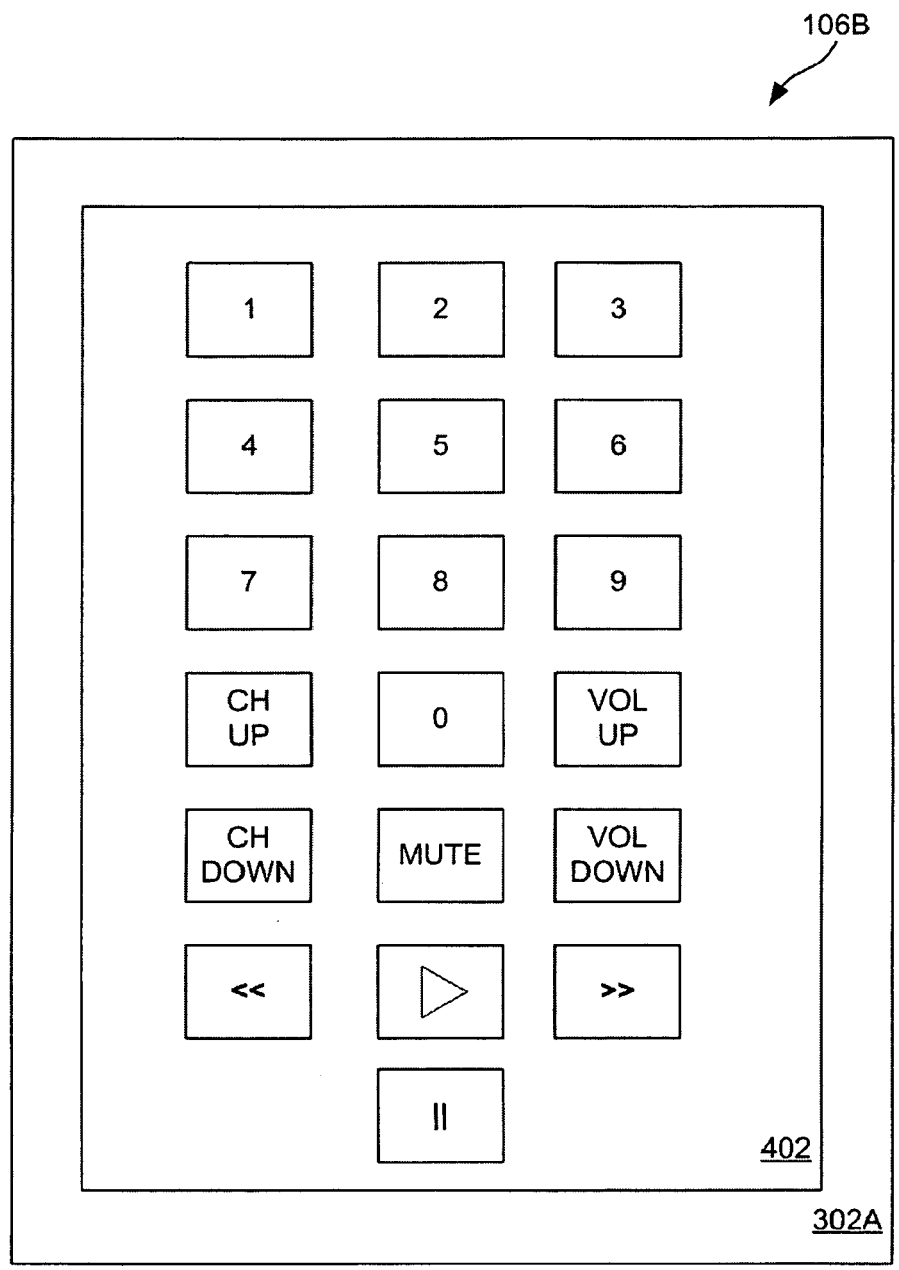
FIG. 4 illustrates an exemplary embodiment of a mobile communication device of FIG. 2.

FIG. 4 illustrates an exemplary embodiment of a mobile communication device 106B of FIG. 2. More particularly, FIG. 4 illustrates an embodiment of a virtual remote control 402 displayed on a touch screen of an input device 302A. The virtual remote control 402 is operable for emulating the remote control for the entertainment device 102 (see FIG. 2). As illustrated in FIG. 4, the virtual remote control 402 displays frequently used buttons/functions of a television receiver with an integrated DVR. Thus, a user can control the channels, volume or playback of video content outputted by the entertainment device 102. It is to be appreciated that the functions/buttons presented by the virtual remote control 402 may vary depending on the functionality of the entertainment device 102 to be controlled.

In at least one embodiment, the virtual remote control 402 is downloaded by the mobile communication device 106B from the entertainment device 102 (see FIG. 2). For example, the mobile communication device 106B may download the virtual remote control 402 during a set-up process of the mobile communication device 106B. In other embodiments, the entertainment device 102 may transmit an updated virtual remote control 402 depending on a particular menu displayed by the entertainment device 102, or a particular functionality presently enabled on the entertainment device 102. For example, if the user 108 is presently viewing an electronic programming guide (EPG) on the entertainment device 102, then the virtual remote control 402 may be customized to emulate the EPG, allowing the user to touch a particular region of the input device 302 to select a program to watch. In other embodiments, the functions/buttons displayed by the virtual remote control 402 may vary depending on whether the user 108 is utilizing the television receiver or the DVR functionality of the entertainment device 102. For example, the mobile communication device 106B may store multiple virtual remote control 402 layouts and receive menu information from the entertainment device 102 (see FIG. 2) indicating the particular menu presently outputted for display. Responsive to receiving the menu information, the mobile communication device 106B selects and presents the appropriate virtual remote control 402 layout to the user 108.

Figure 5:
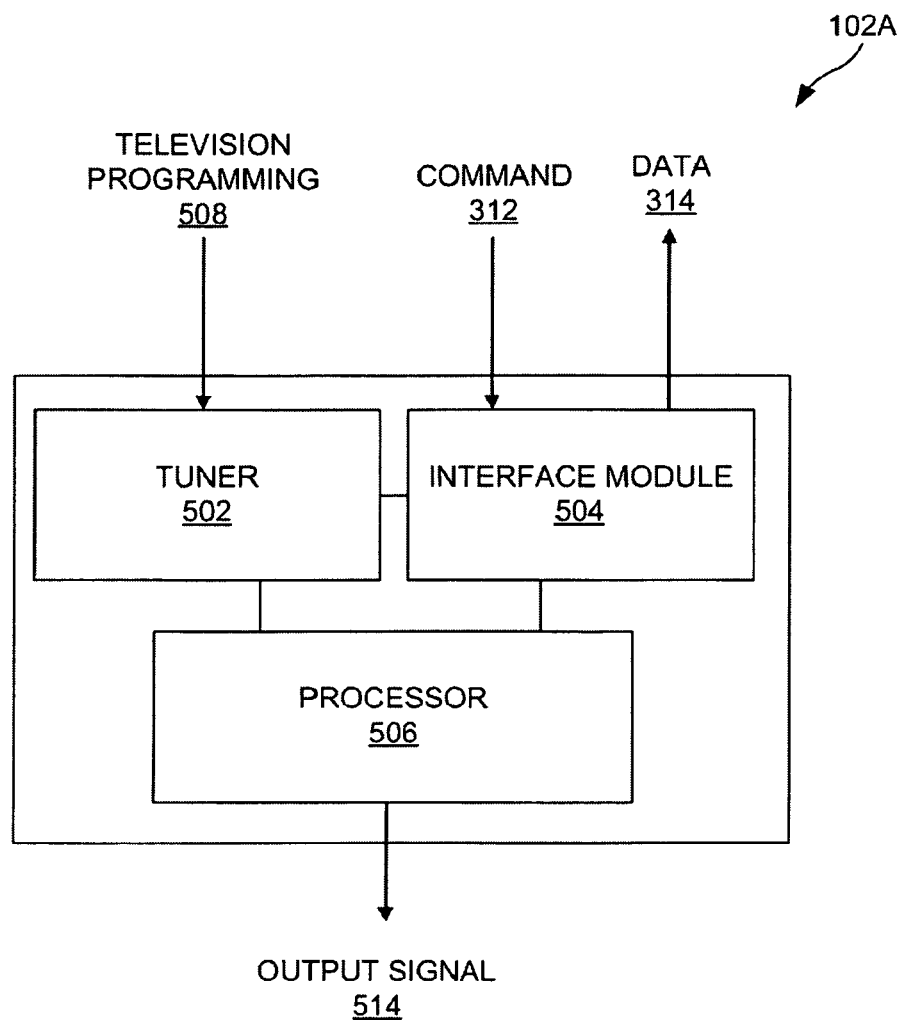
FIG. 5 illustrates an embodiment of an entertainment device of FIG. 2.

FIG. 5 illustrates an embodiment of an entertainment device 102A of FIG. 2. More particularly, FIG. 5 illustrates an entertainment device 102A embodied as a television receiver (e.g., a set-top box). The entertainment device 102A includes a tuner 502, an interface module 504 and a processor 506. Each of these components is discussed in greater detail below. The entertainment device 102A may include other components, devices or elements not illustrated for the sake of brevity.

The tuner 502 is operable for receiving the television programming 508. The tuner 502 may be operable for receiving and tuning any type of television programming 508. For example, the tuner 502 may receive an over-the-air broadcast, a direct broadcast satellite signal or a cable television signal.

The interface module 504 is operable to wirelessly receive and/or transmit data to the mobile communication device 106 (see FIG. 2). The interface module 504 may communicate with the mobile communication device 106A utilizing any type of IR or RF communication link. In at least one embodiment, the interface module 504 receives the command 312 from the mobile communication device 106, and responsively provides the command 312 to the processor 506. In some embodiments, the interface module 504 receives the data 314 and responsively transmits the data 314 to the mobile communication device 106 for transmission to the application server 204.

The processor 506 is operable for controlling the operation of the entertainment device 102 (see FIG. 2). In at least one embodiment, the processor 506 receives the television programming 508 and responsively generates an output signal 514 for presentation on a display device. The processor 506 is further operable to receive the command 312 and manipulate the playback of the television programming 508 responsive to the command. In other words, the processor 506 operates responsive to the command 312 to control the output signal 514.

In some embodiments, the processor 506 is operable to generate the data 514 that is transmitted to the application server 204 (see FIG. 2) through the mobile communication device 106. For example, the processor 506 may collect health and diagnostic information regarding the entertainment device 102A or pay-per-view ordering information that is transmitted to the application server 204. In at least one embodiment, the processor 506 generates demographic information based on the television programming 508, the command 312 and the identifying data regarding the user 108. The demographic information is then transmitted to the application server 204. The processor 506 may also utilize the collected information to update social networking profiles, buddy lists and other information regarding the user 108.

Those of ordinary skill in the art will appreciate that the various functional elements 502 through 506 shown as operable within the entertainment device 102A may be combined into fewer discrete elements or may be broken up into a larger number of discrete functional elements as a matter of design choice. Thus, the particular functional decomposition suggested by FIG. 5 is intended merely as exemplary of one possible functional decomposition of elements within the mobile communication device 102A.

Figure 6:
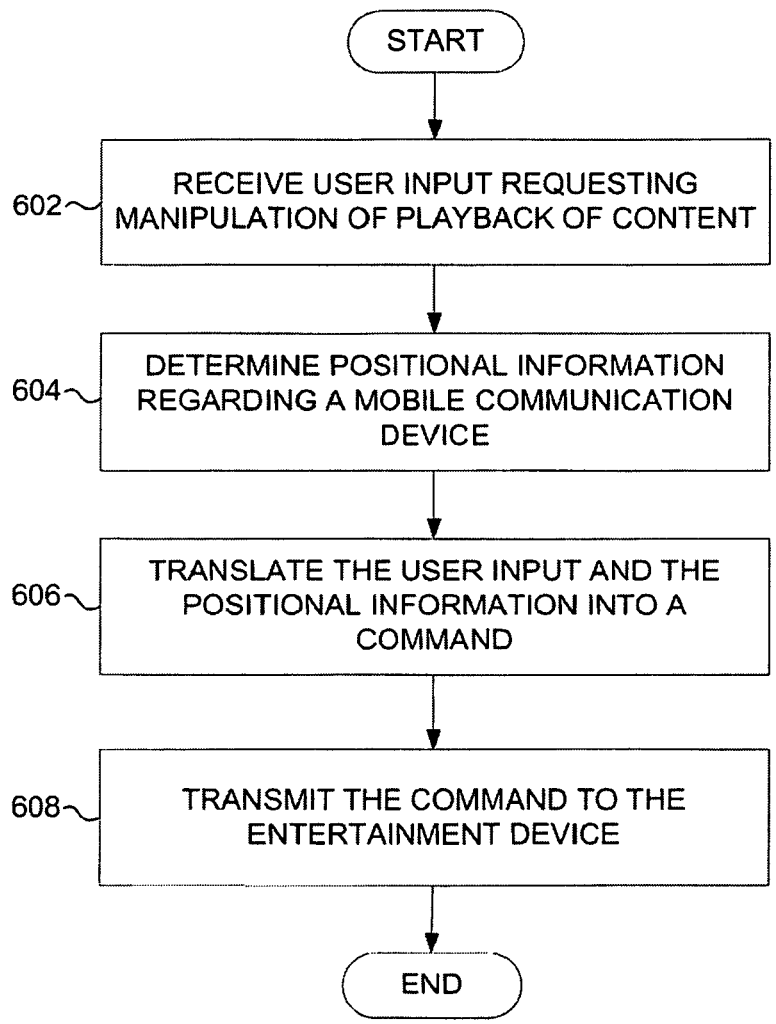
FIG. 6 illustrates an embodiment of a process for remotely operating an entertainment device.

FIG. 6 illustrates an embodiment of a process for remotely operating an entertainment device. More particularly, FIG. 6 illustrates a process for manipulating the playback of video content by an entertainment device. The operations of the process of FIG. 6 are not all-inclusive, and may comprise other operations not illustrated for the sake of brevity.

The process includes receiving user input, through a mobile communication device, requesting manipulation of playback of content outputted for presentation by an entertainment device (operation 602). The request may include any function that the entertainment device is capable of performing to manipulate the playback of the content. Exemplary functions include changing channels, changing the volume, changing the brightness or contrast of the display device, enabling a picture-in-picture mode, performing trick play mode functions (e.g., fast forwarding, rewinding, pausing) and the like. For example, a user may utilize a keypad of the mobile communication device to input a new channel that they desire to watch or to pause the playback of recorded content. In some embodiments, the user input may include a selection of an interactive item within a menu presented by the entertainment device.

The process further includes determining positional information regarding the mobile communication device (operation 604). The positional information may be determined based on movements of the mobile communication device by a user. An accelerometer, gyroscope or other type of motion detector may be utilized to detect the motion and positional information of the mobile communication device.

The process further includes translating the user input and the positional information into a command compatible with the entertainment device (operation 606). The positional information and the user input may be translated into an IR code or other command transmitted through a wireless communication link between the entertainment device and the mobile communication device.

The process further includes transmitting the command to the entertainment device (operation 608). Responsive to receiving the command, the entertainment device utilizes the command to output a cursor on a menu and manipulate playback of the content on a display device communicatively coupled to the entertainment device. For example, the user may be viewing an EPG to select a new program to watch, and may use the remote control to position a cursor over a desired program. Responsive to moving the cursor over the desired program, the user may utilize an "enter" button or the like to select and initiate viewing of the program. In at least one embodiment, the entertainment device and the display device are integrated within a single unit. For example, the entertainment device may comprise a television receiver incorporated within a television.

Thus, through the operation of the process of FIG. 6, a user may manipulate playback of content by an entertainment device using a mobile communication device. Further, the process of FIG. 6 may optionally include the mobile communication device receiving data from the entertainment device and transmitting the data to an application server or another device or system. Thus, the mobile communication device may operate as a backchannel for the entertainment device, transmitting any type of information to the application server on behalf of the entertainment device.

Figure 7:
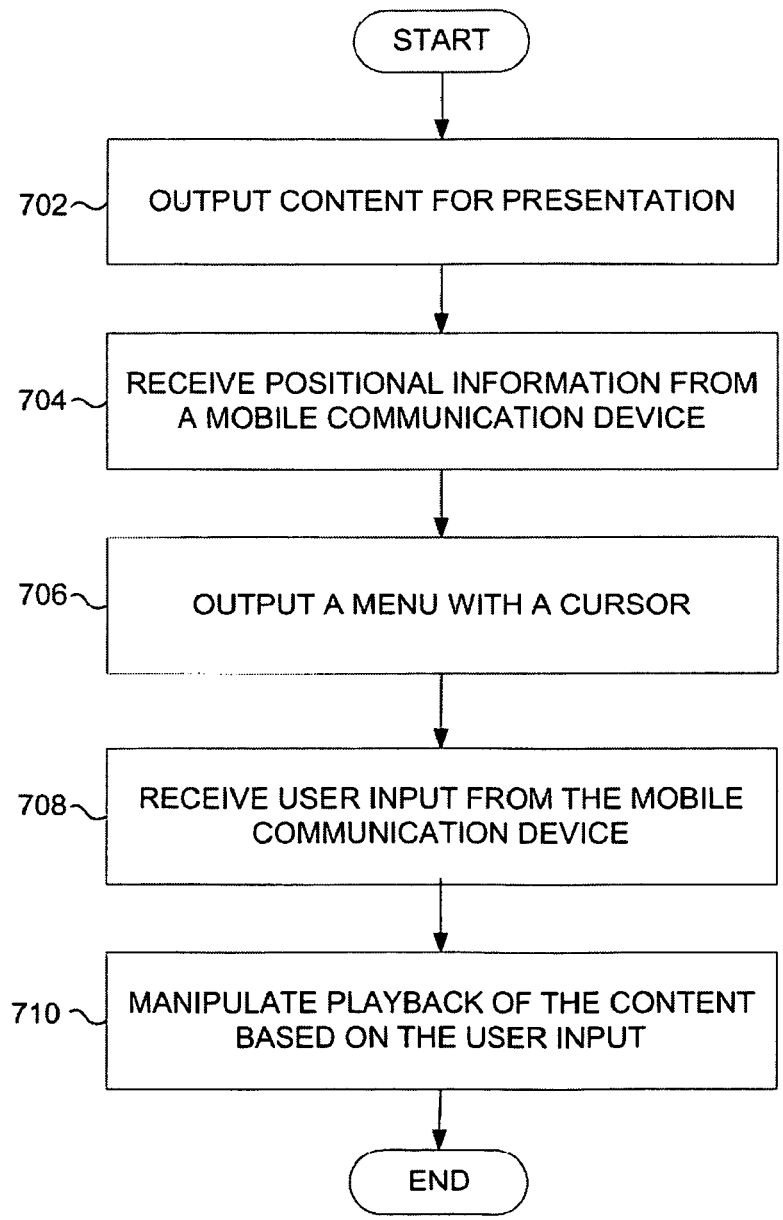
FIG. 7 illustrates an embodiment of a process for presenting content on a display device.

FIG. 7 illustrates an embodiment of a process for presenting content on a display device. More particularly, FIG. 7 illustrates a process for manipulating the playback of video content by an entertainment device based on positional information and user input received from a mobile communication device. The operations of the process of FIG. 7 are not all-inclusive, and may comprise other operations not illustrated for the sake of brevity.

The process includes outputting content for presentation on a display device (operation 702). The content presented may include any type of image or video data. If the display device is separate from the entertainment device outputting content (e.g., a set-top box), then the output signal may be transferred through a wired or wireless connection between the entertainment device and the display device.

The process further includes receiving positional information from a mobile communication device (operation 704). In at least one embodiment, the positional information received from the mobile communication device is processed by the entertainment device into a format appropriate for use by the entertainment device. For example, the entertainment device may receive signals that are converted into x, y coordinates of a coordinate system associated with the output of the entertainment device. In other embodiments, the mobile communication device may perform processing functions on the positional information to translate the positional information into a format compatible with the entertainment device. For example, the mobile communication device may measure signals indicating a direction of movement of the mobile communication device, and translate the signal into coordinates of the coordinate system of the entertainment device.

The process further includes outputting a menu with a cursor, for presentation on the display device (operation 706). A position of the cursor is derived based on the positional information. Thus, as the user moves the mobile communication device, the cursor displayed on screen will move to correspond with the position of the mobile communication device.

The process further includes receiving user input from the mobile communication device (operation 708). In at least one embodiment, the user input requests manipulation of playback of content presented by the entertainment device. A user may input information to the mobile communication device as described above in operation 602 of FIG. 6, and the entertainment device may receive the user input in a wireless transmission process similar to that discussed in operation 608 of FIG. 6. The process further includes manipulating playback of the content based on the user input (operation 708). Thus, the user can change the playback of content using the mobile communication device rather than a remote control associated with the entertainment device.

Figure 8:
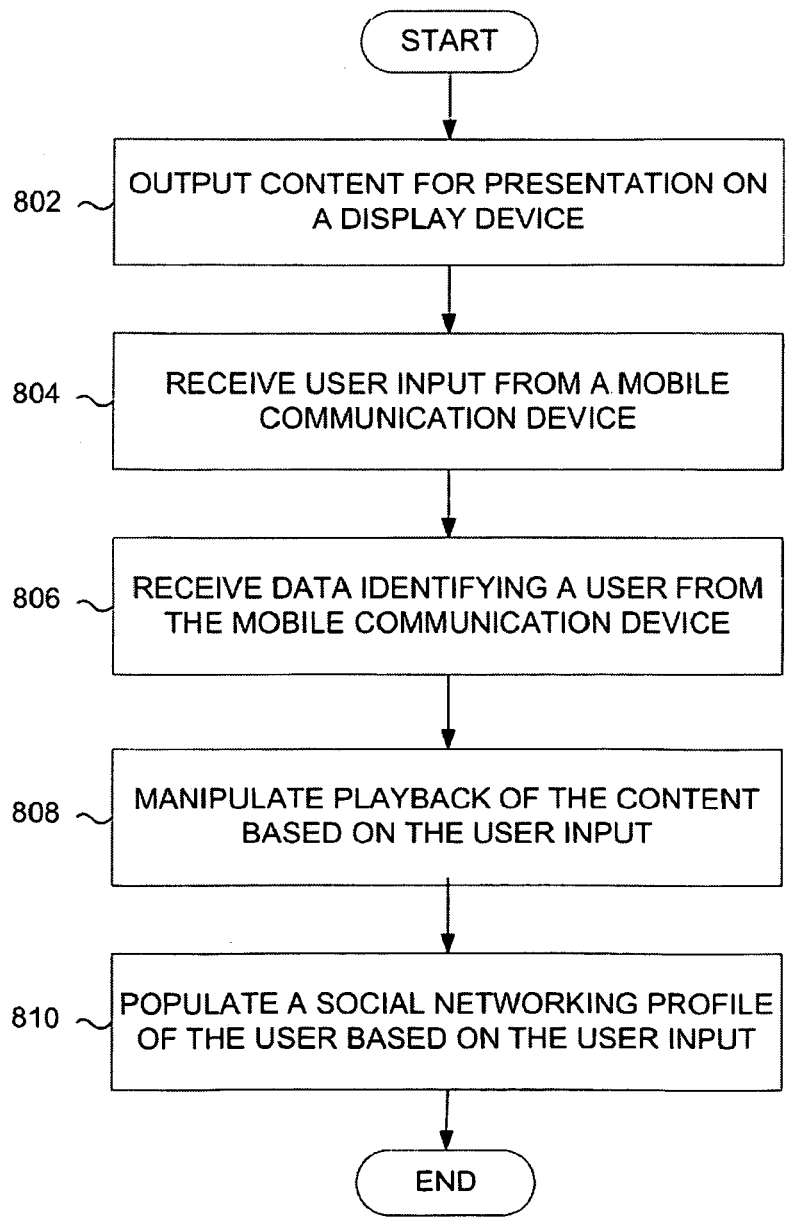
FIG. 8 illustrates an embodiment of a process for populating a social networking profile of a user based on viewing data.

FIG. 8 illustrates an embodiment of a process for populating a social networking profile of a user based on viewing data. More particularly, FIG. 8 illustrates a process for populating a profile of the user when the user utilizes a mobile communication device to remotely operate an entertainment device. The operations of the process of FIG. 8 are not all-inclusive, and may comprise other operations not illustrated for the sake of brevity.

The process includes outputting content for presentation on a display device (operation 802). Operation 802 may be performed as described in operation 702 of FIG. 7. The process further includes receiving user input from a mobile communication device requesting manipulation of playback of content presented by an entertainment device (operation 804). The user input may request any kind of manipulation of the content, such as channel changes, volume changes and pausing of live or recorded content.

The process further includes receiving data identifying a user from the mobile communication device (operation 806). The identifying data may be any type of information that identifies the user individually or as a member of a group. For example, the data may identify the user as a member of a certain group or as having specific characteristics (e.g., an 18-40 year male). The identifying data may be collected using a variety of techniques. For example, the identifying data may be collected based on account information of the user of the mobile communication device. The identifying data may also be collected based on user responses to a survey or other questionnaire. In at least one embodiment, the identifying data may include a username or account number of the user on a social network. In some embodiments, the identifying data may be transmitted with each command from the mobile communication device. The identifying data may be transmitted with the first command during a viewing session or periodically during the viewing session. The process further includes manipulating playback of the content based on the user input (operation 808). The content manipulation may be performed as described in operation 710 of FIG. 7.

The process further includes populating a social networking profile of the user based on the user input (operation 810). For example, if the entertainment device determines that a user changed the channel to watch a program, then a message may be displayed to members of the user's buddy lists that they are presently watching that particular program. Thus, the friends may then tune to that program as well, or may know not to disturb the user during the time period of that particular program based on the message displayed in the buddy lists. The profile update message function may be performed automatically by the entertainment device, or may be performed responsive to input by the user. For example, the user may press a particular key of the mobile communication device to initiate the profile update function on the entertainment device.

In at least one embodiment, the entertainment device may communicate with an application server through a data network communicatively coupled to the entertainment device. For example, the entertainment device may be connected to a broadband network, and may transmit data to the application server through the broadband network. In other embodiments, the entertainment device may communicate with the application server through the mobile communication device. In other words, the mobile communication device receives data from the entertainment device, and further transmits the data to the application server through a wireless network.

In at least one embodiment, the entertainment device may tabulate the programs that the user frequently watches over a period of time, and responsively update the user's social networking profile based on the tabulated information. For example, the entertainment device may identify that a user watches every new episode of a particular program, and may responsively update the favorite shows section of the user's social networking profile to reflect this information.

In at least one embodiment, the tabulation information may be transmitted from the entertainment device to the mobile communication device after each episode or viewing session for storage and further updating. Thus, if a user utilizes multiple entertainment devices to regularly view video content, then the mobile communication device can provide the tabulation data to an entertainment device during each viewing session for updating based on the programming viewed by the user. Thus, the tabulated information is aggregated based on viewing across multiple entertainment devices during different viewing sessions.

Figure 9:
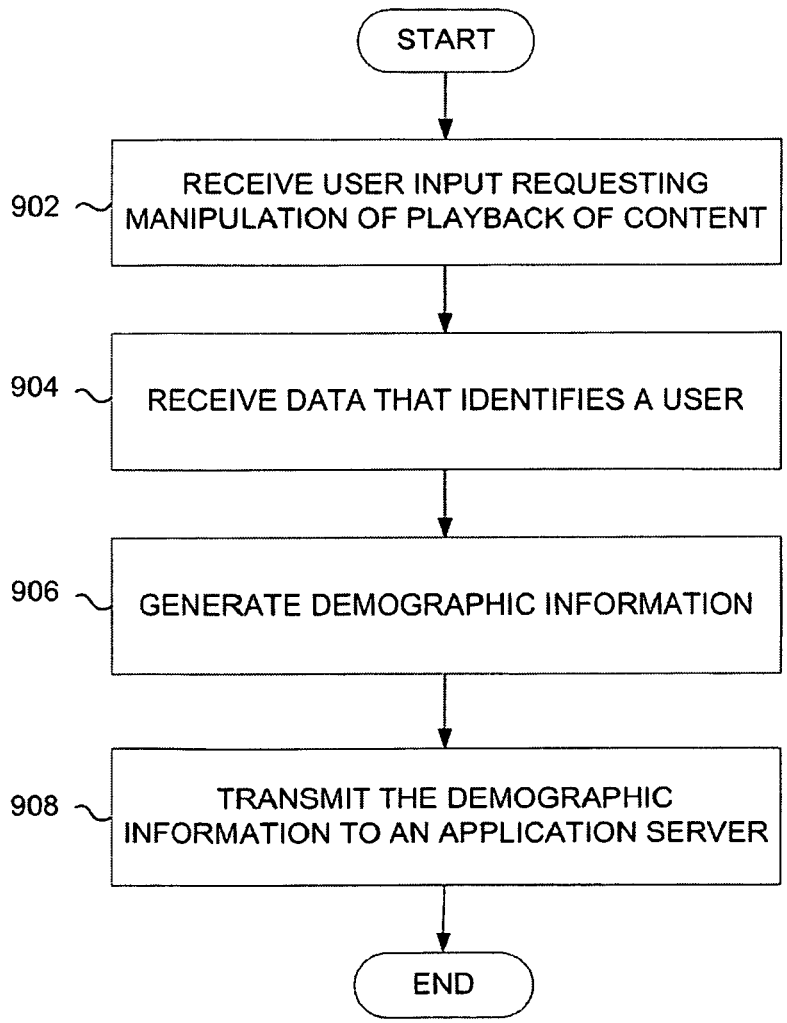
FIG. 9 illustrates an embodiment of a process for collecting demographic information regarding video content.

The data collected by the entertainment device may be utilized for other purposes, such as aggregating demographic information regarding television programming. FIG. 9 illustrates an embodiment of a process for collecting demographic information regarding video programming. The operations of the process of FIG. 9 are not all-inclusive, and may comprise other operations not illustrated for the sake of brevity.

The process includes receiving user input requesting manipulation of playback of content on an entertainment device (operation 902). Operation 902 may be performed similarly to operation 602 of FIG. 6. In at least one embodiment, the user input is received by a mobile communication device and transmitted to an entertainment device for processing. The process further includes receiving data that identifies a user (operation 904). Operation 904 may be performed as described in operation 806 of FIG. 8.

The process further includes generating demographic information regarding the content based on the identifying data (operation 906). It is to be appreciated that the demographic information may include any type of information regarding the user's viewing characteristics. For example, the demographic information may identify that a male between the ages of 18-40 watched a particular program on a particular date. The demographic information may include further granularity, such that the user watched the program until the commercial break, and then channel surfed for 2 minutes before switching back to the original program they were watching.

The process further includes transmitting the demographic information to an application server (operation 908). In at least one embodiment, the entertainment device may transmit the demographic information using a data network communicatively coupled to the entertainment device. In other embodiments, the demographic information may be transmitted to the application server through the mobile communication device. Thus, the mobile communication device may operate as a backchannel for the demographic information. The application server may then utilize the demographic information to generate reports and other information regarding the video programming.

In at least one embodiment, the demographic information may also be utilized locally to target advertisements to a user. The entertainment device may determine the appropriate demographic group for the user, and may insert a targeted advertisement within the video program. The entertainment device may request appropriate ads from an application server during the viewing session, or may store a bank of advertisements and select the most appropriate advertisements for the user based on the demographic information. Thus, the user is presented with an advertisement that has the most likely appeal based on the user's demographic information.

Although specific embodiments were described herein, the scope of the invention is not limited to those specific embodiments. The scope of the invention is defined by the following claims and any equivalents therein.

What is claimed is:

1. A mobile communication device comprising:
   an input device that receives user input requesting manipulation of playback of content outputted for presentation by a television receiver;
   a motion detector that determines positional information regarding the mobile communication device based on a light signal from a light source controlled by the television receiver and integrated in or proximate to the television receiver, the light signal received at the mobile communication device;
   a processor communicatively coupled to the input device and communicatively coupled to the motion detector that translates the user input and the positional information into a command compatible with the television receiver;
   a wireless transmitter that transmits the command to the television receiver wherein the television receiver utilizes the command to output a cursor on a menu and manipulate playback of the content on a display device communicatively coupled to the television receiver; and
   a wireless receiver that receives data from the television receiver, and wherein the wireless transmitter transmits the data to an application server.

2. The mobile communication device of claim 1, wherein the input device comprises a touch screen displaying a virtual remote control for the television receiver.

3. The mobile communication device of claim 2, wherein the processor downloads the virtual remote control from the television receiver.

4. The mobile communication device of claim 2, wherein the wireless receiver receives menu information from the television receiver regarding a menu outputted for presentation by the television receiver, and wherein the processor customizes the virtual remote control based on the menu information.

5. The mobile communication device of claim 1, wherein the mobile communication device transmits identifying data regarding a user to the television receiver in association with the command, and wherein the identifying data is utilized by the television receiver to generate demographic information.

6. The mobile communication device of claim 1, wherein the motion detector is operable to detect and measure an intensity of the received light signal.

7. The mobile communication device of claim 1, wherein the motion detector is operable to detect a plurality of received light signals.

8. A television receiver comprising:
a tuner that receives television programming from a programming source;
a light source that produces positional reference information;
an interface module that wirelessly communicates with a mobile communication device and receives user input and positional information from the mobile communication device;
a processor communicatively coupled to the tuner that manipulates playback of the programming on a display device based on the user input, and that outputs a menu for presentation on the display device, generating a cursor of the menu based on the positional information; and
wherein the interface module transmits data to the mobile communication device, the mobile communication data further transmitting the data to an application server.

9. The television receiver of claim 8, wherein the interface module transmits a virtual remote to the mobile communication device for display by the mobile communication device.

10. The television receiver of claim 8, wherein the interface module receives identifying data regarding the user in association with the command from the mobile communication device, and wherein the processor generates demographic information regarding the television programming based on the identifying data.

11. The television receiver of claim 8, wherein the interface module receives identifying data regarding the user in association with the command from the mobile communication device, and wherein the processor utilizes the identifying data to populate a social networking profile of the user based on the user input.

12. A method for remotely operating a television receiver, the method comprising:
receiving user input, through a mobile communication device, requesting manipulation of playback of content outputted for presentation by a television receiver;
producing positional reference information with a light source controlled by the television receiver and integrated in or proximate to the television receiver;
determining positional information regarding the mobile communication device;
translating the user input and the positional information into a command compatible with the television receiver;
transmitting the command to the television receiver, wherein the television receiver utilizes the command to output a cursor on a menu and manipulate playback of the content;
receiving data from the television receiver; and
transmitting the data to an application server.

13. The method of claim 12, further comprising:
downloading a virtual remote control from the television receiver; and
displaying the virtual remote control on a touch screen of the mobile communication device, wherein the user input is inputted using the touch screen.

14. The method of claim 13, further comprising:
receiving an updated virtual remote control from the television receiver, wherein the virtual remote control is updated to correspond with the menu outputted by the television receiver.

15. The method of claim 12, further comprising:
transmitting identifying data regarding a user to the television receiver in association with the command;
receiving demographic information generated by the television receiver based on the identifying data; and
transmitting the demographic information to an application server.

16. A method for presenting content on a display device, the method comprising:
outputting content for presentation on a display device;
outputting positional reference information with a light source controlled by a receiving device and integrated in or proximate to the receiving device configured to direct output of the content;
receiving user input from a mobile communication device, the user input including positional information derived by the mobile communication device from the positional reference information;
receiving identifying data regarding a user in association with the user input from the mobile communication device;
manipulating playback of the content based on the user input; and
populating a social networking profile of the user based on the user input.

17. The method of claim 16, wherein populating a social networking profile of the user based on the user input further comprises:
tabulating a list of television programs frequently watched by the user based on the data and the user input; and
populating the social networking profile with the list of the television programs.

18. The method of claim 16, wherein populating a social networking profile of the user based on the user input further comprises:
populating the social networking profile with a message indicating that the user is presently watching television.

* * * * *